United States Patent
Choy et al.

(10) Patent No.: US 9,458,016 B2
(45) Date of Patent: *Oct. 4, 2016

(54) LITHIUM IRON PHOSPHATE HAVING OLIVINE STRUCTURE AND METHOD FOR PREPARING THE SAME

(75) Inventors: Sanghoon Choy, Daejeon (KR); Yong Tae Lee, Jeonju-Si (KR); Hong-Kyu Park, Daejeon (KR); Soo Min Park, Daejeon (KR); Ji Eun Lee, Seoul (KR)

(73) Assignee: LG CHEM, LTD., Seoul (KR)

( * ) Notice: Subject to any disclaimer, the term of this patent is extended or adjusted under 35 U.S.C. 154(b) by 298 days.

This patent is subject to a terminal disclaimer.

(21) Appl. No.: 12/709,200

(22) Filed: Feb. 19, 2010

(65) Prior Publication Data

US 2010/0233540 A1 Sep. 16, 2010

Related U.S. Application Data

(63) Continuation of application No. PCT/KR2009/006084, filed on Oct. 21, 2009.

(30) Foreign Application Priority Data

Oct. 22, 2008 (KR) ........................ 10-2008-0103562

(51) Int. Cl.
*H01M 4/525* (2010.01)
*C01B 25/45* (2006.01)
(Continued)

(52) U.S. Cl.
CPC ............ *C01B 25/45* (2013.01); *H01M 4/5825* (2013.01); *H01M 4/043* (2013.01); *H01M 4/131* (2013.01); *H01M 2004/021* (2013.01)

(58) Field of Classification Search
CPC ... C01B 25/45; H01M 4/5825; H01M 4/043; H01M 4/131

USPC .............. 423/305, 306; 429/218.1, 220, 221, 429/223, 224, 229, 231.1, 231.2, 231.3, 429/231.5, 231.6, 231.9, 231.95
See application file for complete search history.

(56) References Cited

U.S. PATENT DOCUMENTS

2002/0086214 A1\* 7/2002 Barker et al. ................. 429/232
2004/0033360 A1 2/2004 Armand et al.
(Continued)

FOREIGN PATENT DOCUMENTS

EP 1 850 409 A1 10/2007
JP 2001-85010 A 3/2001
(Continued)

OTHER PUBLICATIONS

Lee et al., "Synthesis of LiFePO$_4$ Micro and Nanoparticles in Supercritical Water", Materials Letters, vol. 60, 2006, p. 2105-2109, Elsevier B.V.

(Continued)

*Primary Examiner* — Jun Li
(74) *Attorney, Agent, or Firm* — Birch, Stewart, Kolasch & Birch, LLP (57) ABSTRACT

Provided is an olivine-type lithium iron phosphate composed of secondary particles having a mean particle diameter (D50) of 5 to 100 μm, formed by aggregation of primary particles having a mean particle diameter (D50) of 50 to 550 nm, wherein the primary and secondary particles have a composition represented by Formula I below and the secondary particles have a porosity of 15 to 40%: $Li_{1+a}Fe_{1-x}M_x(PO_{4-b})X_b$ (I) wherein M is selected from Al, Mg, Ni, Co, Mn, Ti, Ga, Cu, V, Nb, Zr, Ce, In, Zn, Y and combinations thereof; X is selected from F, S, N and combinations thereof; $-0.5 \leq a \leq +0.5$; $0 \leq x \leq 0.5$; and $0 \leq b \leq 0.1$.

9 Claims, 4 Drawing Sheets

(51) Int. Cl.
*H01M 4/58* (2010.01)
*H01M 4/04* (2006.01)
*H01M 4/131* (2010.01)
*H01M 4/02* (2006.01)

(56) References Cited

U.S. PATENT DOCUMENTS

| | | | |
|---|---|---|---|
| 2006/0263286 A1 | 11/2006 | Wu et al. | |
| 2007/0059598 A1* | 3/2007 | Yang | 429/209 |
| 2007/0207080 A1 | 9/2007 | Yang et al. | |
| 2009/0142668 A1 | 6/2009 | Ishii | |
| 2009/0155689 A1* | 6/2009 | Zaghib et al. | 429/221 |
| 2010/0323245 A1* | 12/2010 | Liang | B82Y 30/00 429/231.5 |

FOREIGN PATENT DOCUMENTS

| | | |
|---|---|---|
| JP | 2001-110414 A | 4/2001 |
| JP | 2002-15735 A | 1/2002 |
| JP | 2004-259470 A | 9/2004 |
| JP | 2007-294461 A | 11/2007 |
| JP | 2008-243662 A | 10/2008 |
| JP | 2009-4371 A | 1/2009 |
| JP | 2009-32678 A | 2/2009 |
| JP | 2009-152188 A | 7/2009 |
| JP | 2010-27603 A | 2/2010 |
| JP | 2010-67374 A | 2/2010 |
| JP | 2010-73520 A | 4/2010 |
| WO | WO 2007/094644 A1 | 8/2007 |
| WO | WO 2008/067677 A1 | 8/2008 |

OTHER PUBLICATIONS

Indian Office Action issued in Indian Patent Application No. 2833/DELNP/2011 on Jan. 24, 2015.

Lee et al., "Synthesis of LiFePO4 micro and nanoparticles in supercritical water"; Materials Letters, vol. 60, Nos. 17-18 (2006) pp. 2105-2109.

Liang et al., "Lithium iron phosphate with high-rate capability synthesized through hydrothermal reaction in glucose solution", Journal of Power Sources, vol. 184, No. 2 (2008) pp. 538-542.

Japanese Office Action issued in Japanese Patent application No. 2011-533103 on Jun. 2, 2015, with embedded partial English translation.

* cited by examiner

FIG. 8

LITHIUM IRON PHOSPHATE HAVING OLIVINE STRUCTURE AND METHOD FOR PREPARING THE SAME

FIELD OF THE INVENTION

The present invention relates to lithium iron phosphate having an olivine structure and a method for preparing the same. More specifically, the present invention relates to an olivine-type lithium iron phosphate composed of secondary particles having a mean particle diameter (D50) of 5 to 100 μm, formed by aggregation of primary particles having a mean particle diameter (D50) of 50 to 550 nm, wherein the primary and secondary particles have a composition represented by Formula I below and the secondary particles have a porosity of 15 to 40%.

BACKGROUND OF THE INVENTION

Technological development and increased demand for mobile equipment have led to a rapid increase in the demand for secondary batteries as energy sources. Among these secondary batteries, lithium secondary batteries having high energy density and voltage, long life span and low self-discharge are commercially available and widely used.

The lithium secondary batteries generally use a carbon material as an anode active material. Also, the use of lithium metals, sulfur compounds, silicon compounds, tin compounds and the like as the anode active material are considered. Meanwhile, the lithium secondary batteries generally use lithium cobalt composite oxide ($LiCoO_2$) as a cathode active material. Also, the use of lithium-manganese composite oxides such as $LiMnO_2$ having a layered crystal structure and $LiMn_2O_4$ having a spinel crystal structure and lithium nickel composite oxide ($LiNiO_2$) as the cathode active material has been considered.

$LiCoO_2$ is currently used owing to superior physical properties such as cycle life, but has disadvantages of low stability and high-cost due to use of cobalt, which suffers from natural resource limitations, and limitations of mass-use as a power source for electric automobiles. $LiNiO_2$ is unsuitable for practical application to mass-production at a reasonable cost due to many features associated with preparation methods thereof. Lithium manganese oxides such as $LiMnO_2$ and $LiMn_2O_4$ have a disadvantage of short cycle life.

In recent years, methods to use lithium transition metal phosphate as a cathode active material have been researched. Lithium transition metal phosphate is largely divided into $Li_xM_2(PO_4)_3$ having a NASICON structure and $LiMPO_4$ having an olivine structure, and is found to exhibit superior high-temperature stability, as compared to conventional $LiCoO_2$. To date, $Li_3V_2(PO_4)_3$ is the most widely known NASICON structure compound, and LiFePO4 and Li(Mn,Fe)$PO_4$ are the most widely known olivine structure compounds.

Among olivine structure compounds, $LiFePO_4$ has a high voltage of 3.5 V and a high bulk density of 3.6 $g/cm^3$, as compared to lithium, has a theoretical capacity of 170 mAh/g and exhibits superior high-temperature stability, as compared to cobalt (Co), and utilizes cheap Fe, thus being highly applicable as the cathode active material for lithium secondary batteries.

However, $LiFePO_4$ has limited practical application due to the following disadvantages.

First, $LiFePO_4$ exhibits low electrical conductivity, thus disadvantageously causing an increase in inner resistance of batteries, when used as the cathode active material. This increase also leads to an increase in polarization potential, when electric circuits close, and thus a decrease in battery capacity.

Second, $LiFePO_4$ has a density lower than that of a general cathode active material, thus having a limitation in that considerably increasing the energy density of batteries is not possible.

Third, since an olivine crystal structure, from which lithium is deintercalated, is extremely unstable, a passage, allowing the lithium to escape from the crystal structure is blocked and intercalation/deintercalation rate of the lithium is thus delayed.

In this regard, Japanese Patent Application Publication No. 2001-110414 discloses incorporation of a conductive material into olivine-type metal phosphate to improve conductivity and Japanese Patent Publication No. 2001-85010 discloses a technology for doping electrochemically stable elements to stabilize crystal structure.

However, these technologies relatively deteriorate a volume rate of a cathode active material in batteries, thus lowering an energy density of batteries. For this reason, these technologies cannot provide an ultimate solution. In addition, addition of a conductive material or doping elements inevitably entails an addition or substitution process, thus disadvantageously increasing manufacturing costs and deteriorating process efficiency.

In response to this, a decrease in size of olivine crystals to a nanometer-scale in order to shorten a movement distance of lithium ions and thus increase discharge capacity is disclosed in Japanese Patent Application Publication Nos. 2002-15735 and 2004-259470.

However, fabrication of electrodes using such an olivine particle with a fine diameter inevitably entails use of a large amount of binder, thus disadvantageously lengthening slurry mixing time and deteriorating process efficiency.

Accordingly, there is an increasing need for lithium iron phosphate such as $LiFePO_4$ that exhibits superior electrical conductivity and density as well as process efficiency.

SUMMARY OF THE INVENTION

Therefore, the present invention has been made to solve the above problems and other technical problems that have yet to be resolved.

As a result of a variety of extensive and intensive studies and experiments to solve the problems as described above, the inventors of the present invention have discovered that lithium iron phosphate composed of secondary particles with a predetermined porosity, formed by aggregation of primary particles having a small diameter, can satisfy superior electrical conductivity, stable crystal structure and high density, which are advantages of smaller primary particles, as well as high process efficiency, which is an advantage of secondary particles, thus ultimately maximizing capacity and energy density of electrodes and batteries. Based on this discovery, the present invention has been completed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

1. Olivine-Type Lithium Iron Phosphate

In accordance with an aspect of the present invention, the above and other objects can be accomplished by the provision of an olivine-type lithium iron phosphate composed of secondary particles having a mean particle diameter (D50) of 5 to 100 μm, formed by aggregation of primary particles having a mean particle diameter (D50) of 50 to 550 nm, wherein the primary and secondary particles have a composition represented by Formula I below and the secondary particles have a porosity of 15 to 40%:

$$Li_{1+a}Fe_{1-x}M_x(PO_{4-b})X_b \quad (I)$$

wherein

M is selected from Al, Mg, Ni, Co, Mn, Ti, Ga, Cu, V, Nb, Zr, Ce, In, Zn, Y and combinations thereof;

X is selected from F, S, N and combinations thereof;

$-0.5 \leq a \leq +0.5$;

$0 \leq x \leq 0.5$; and $0 \leq b \leq 0.1$.

As mentioned hereinbefore, particles having a small diameter disadvantageously deteriorate process efficiency. In an attempt to solve this disadvantage, the present inventors considered that secondary particles are formed by aggregation of primary particles having a small diameter.

When secondary particles are formed of primary particles wherein pores are hardly present therebetween, they maintain their shape, thus lengthening the Li+ diffusion distance from the surface of the secondary particles to the center thereof and deteriorating rate properties. In addition, in the case where carbon is coated on such a secondary particle, if desired, it cannot be coated to an inner part of the secondary particle, thus ultimately causing deterioration in electrical conductivity.

The present inventors discovered that when secondary particles having a high porosity are prepared and used for the pressing process to fabricate an electrode, at least a portion of them may be deformed and thus converted to primary particles, thus causing deterioration in Li+ diffusion capability and electrical conductivity.

That is, the olivine-type lithium iron phosphate according to the present invention is in the form of secondary particles wherein primary particles are aggregated and have a high porosity, thus exerting superior electrical conductivity and a high density, which are advantages of smaller primary particles, as well as high process efficiency, which is an advantage of secondary particles. More specifically, the use of the olivine-type lithium iron phosphate in the form of secondary particles enables reduction in amounts of binder and solvent used to prepare an electrode and shortening of mixing and drying periods.

As a result, the use of the olivine-type lithium iron phosphate according to the present invention ultimately maximizes capacity and energy density of electrodes and batteries.

The secondary particles may have a porosity of 15 to 40% so that they can be converted into primary particles in the process of pressing electrodes.

When the secondary particles have a porosity less than 15%, refinement of the secondary particles necessarily requires application of a pressure higher than that in general cases. On the other hand, when the porosity exceeds 40%, bonding strength between primary particles is low, making handling difficult. Furthermore, more preferably, the secondary particles have a porosity of 20 to 30%, taking consideration into uniform dispersion and process efficiency of primary particles.

The pores present in the secondary particles may be closed- or open-type. When taking into consideration easy preparation and uniform dispersion of primary particles, the primary particles preferably have a plurality of small pores. Accordingly, these pores preferably have a size of 10 to 1000 nm, more preferably 200 to 700 nm, when measured using an Hg porosimeter.

Meanwhile, primary particles should be used in a crystallized form to form secondary particles, so that they can secure superior electrical conductivity, stable crystal structure and high bulk density, although they are converted from deformed secondary particles in the fabrication of electrodes. That is, it is preferred that primary particles each independently have an olivine crystal structure.

On the other hand, it is undesirable that primary particles be aggregated and crystallized by sintering to prepare secondary particles, since a high pressure should be applied to allow the secondary particles to be returned to the primary particles due to high bonding force between the primary particles, and the secondary particles lose their crystal structure, when deformed. This indicates that improvement in Li+ diffusion and conductivity cannot be realized due to the small diameter.

In addition, to easily return the secondary particles to the primary particles, the secondary particles are preferably formed by aggregating the primary particles via physical bonds such as van der Waals attraction rather than chemical bonds such as covalent or ionic bonds.

The primary particles preferably have a mean particle diameter (D50) of 50 to 550 nm, more preferably 100 to 300 nm, when taking into consideration the facts that when the mean particle diameter of the primary particles is excessively large, ionic conductivity cannot be improved to a desired level and that particles having an excessively small diameter are difficult to prepare.

In addition, when the secondary particles have an excessively large mean particle diameter, porosity therebetween is increased and bulk density is deteriorated, and when the secondary particles have an excessively small mean particle diameter, high process efficiency cannot be obtained.

Accordingly, it is preferred that the secondary particles have a mean particle diameter (D50) of 5 to 100 µm. It is preferred that the secondary particles have a mean particle diameter (D50) of 5 to 40 µm in view of slurry mixing and smoothness of electrode surfaces. It is not preferable that the mean particle diameter (D50) is higher than 40 µm, since precipitation occurs upon slurry mixing.

Preferably, the secondary particles have a specific surface area (BET) of 5 to 15 $m^2/g$.

In addition, the shape of the olivine-type lithium iron phosphate is not particularly limited. Preferably, the olivine-type lithium iron phosphate may have a spherical shape in view of bulk density.

In a preferred embodiment, the olivine-type lithium iron phosphate has a bulk density of 0.5 to 1.5 g/mL. When the olivine-type lithium iron phosphate has the bulk density as defined above, surface area in contact with a conductive material is increased, thus enabling formation of a superior conductive network and exhibiting superior electrical conductivity. More specifically, the olivine-type lithium iron phosphate has a bulk density of 0.8 to 1.3 g/mL.

Meanwhile, the olivine-type lithium iron phosphate has a composition of Formula I below:

$$Li_{1+a}Fe_{1-x}M_x(PO_{4-b})X_b \qquad (I)$$

wherein M is selected from Al, Mg, Ni, Co, Mn, Ti, Ga, Cu, V, Nb, Zr, Ce, In, Zn, Y and combinations thereof;

X is selected from F, S, N and combinations thereof; and $-0.5 \leq a \leq +0.5$, $0 \leq x \leq 0.5$, $0 \leq b \leq 0.1$.

In Formula I, when a, b and x are out of the range defined above, conductivity, capacity or rate properties may be deteriorated or the lithium iron phosphate may lose its olivine structure.

In Formula I, x may be zero and the metal element, M, is an optional element, which is represented by $Li_{1+a}FePO_4$. When the lithium iron phosphate contains M, the olivine crystal structure advantageously becomes highly stable, thereby improving electrical conductivity. However, it is undesirable that M is present in an amount of 0.5 or higher, because it may induce deterioration in capacity.

Preferred examples of lithium iron phosphate include, but are not limited to, $LiFePO_4$, $Li(Fe,Mn)PO_4$, $Li(Fe,Co)PO_4$, $Li(Fe,Ni)PO_4$ and the like.

In some cases, in order to increase conductivity, the lithium iron phosphate may be coated with a conductive material selected from carbon, precious metals, metals, conductive polymers and combinations thereof. In particular, advantageously, the lithium iron phosphate coated with carbon can efficiently improve conductivity, without greatly increasing preparation costs and weight.

2. Cathode Mix

The present invention provides a cathode mix comprising the lithium iron phosphate as a cathode active material. In addition to the cathode active material, the cathode mix may optionally comprise a conductive material, a binder, a filler and the like.

The conductive material is commonly added in an amount of 1 to 30% by weight, based on the total weight of the compound including the cathode active material. Any conductive material may be used without particular limitation so long as it has suitable conductivity without causing adverse chemical changes in the fabricated secondary battery. As examples of the conductive materials that can be used in the present invention, mention may be made of conductive materials, including graphite such as natural or artificial graphite; carbon blacks such as carbon black, acetylene black, KETJEN BLACK® (Conductive Carbon Black, MITSUBISH CHEMICAL), channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component which helps binding of an active material to a conductive material and current collector. The binder is commonly added in an amount of 1 to 30% by weight, based on the total weight of the compound including the anode active material. Examples of the binder include polyvinylidene, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubber, fluoro rubber and various copolymers.

The filler is a component used to inhibit electrode expansion. There is no particular limit to the filler, so long as it does not cause adverse chemical changes in the fabricated battery and is a fibrous material. As examples of the filler, there may be used olefin polymers such as polyethylene and polypropylene; and fibrous materials such as glass fibers and carbon fibers.

3. Cathode

The present invention provides a cathode wherein the cathode mix is applied to a current collector.

The cathode for secondary batteries may be prepared by applying a slurry obtained by mixing the cathode mix with a solvent such as NMP to a cathode current collector, followed by drying and press-rolling.

The cathode current collector is generally fabricated to have a thickness of 3 to 500 µm. There is no particular limit to the cathode current collector, so long as it has suitable conductivity without causing adverse chemical changes in the fabricated battery. As examples of the cathode current collector, mention may be made of stainless steel, aluminum, nickel, titanium, sintered carbon, and aluminum or stainless steel surface-treated with carbon, nickel, titanium or silver. If necessary, these current collectors may also be processed to form fine irregularities on the surface thereof so as to enhance adhesive strength to the cathode active materials. In addition, the current collectors may be used in various forms including films, sheets, foils, nets, porous structures, foams and non-woven fabrics.

4. Lithium Secondary Battery

The present invention provides a lithium secondary battery comprising the cathode, the anode, a separator, and a lithium salt-containing non-aqueous electrolyte.

For example, the anode is prepared by applying an anode mix comprising an anode active material to an anode current collector, followed by drying. The anode mix may comprise the afore-mentioned ingredients, i.e., the conductive material, the binder and the filler.

The anode current collector is generally fabricated to have a thickness of 3 to 500 µm. There is no particular limit to the anode current collector, so long as it has suitable conductivity without causing adverse chemical changes in the fabricated battery. As examples of the anode current collector, mention may be made of copper, stainless steel, aluminum, nickel, titanium, sintered carbon, and copper or stainless steel surface-treated with carbon, nickel, titanium or silver, and aluminum-cadmium alloys. Similar to the cathode current collector, if necessary, these current collectors may also be processed to form fine irregularities on the surface thereof so as to enhance adhesive strength to the anode active materials. In addition, the current collectors may be used in various forms including films, sheets, foils, nets, porous structures, foams and non-woven fabrics.

The separator is interposed between the cathode and anode. As the separator, an insulating thin film having high ion permeability and mechanical strength is used. The separator typically has a pore diameter of 0.01 to 10 µm and a thickness of 5 to 300 µm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous electrolytic solution, solid electrolyte and inorganic solid electrolyte may be utilized.

As the non-aqueous electrolytic solution that can be used in the present invention, for example, mention may be made of aprotic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $LiSiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

5. Method for Preparing Lithium Iron Phosphate

Also, the present invention provides a method for preparing lithium iron phosphate comprising the following steps:

(1) preparing primary particles having a mean particle diameter (D50) of 50 to 550 nm and an olivine crystal structure;

(2) mixing the primary particles with a binder and a solvent to prepare a mixture; and (3) drying the mixture and aggregating the primary particles to prepare secondary particles.

In step (1), the primary particles each independently have an olivine crystal structure. The preparation method of the primary particles is not particularly limited and examples thereof include a solid-phase method, coprecipitation, a hydrothermal method and a supercritical hydrothermal method.

In a preferred embodiment, step (1) may be carried out by a supercritical hydrothermal method.

More specifically, the preparation of lithium iron phosphate may be carried out in accordance with the following steps (a) to (c):

(a) primarily mixing raw materials with an alkalinizing agent to precipitate transition metal hydroxide;

(b) secondarily mixing supercritical or subcritical water with the mixture obtained in step (a) to synthesize lithium metal composite oxide and drying the same; and (c) calcining the lithium metal composite oxide.

In step (a), as a lithium precursor, one of the ingredients, $Li_2CO_3$, $Li(OH)$, $Li(OH).H_2O$, $LiNO_3$ or the like may be used. As an iron (Fe) precursor, a bivalent iron-containing compound such as $FeSO_4$, $FeC_2O_4.2H_2O$ or $FeCl_2$ may be used. As a phosphorus (P) precursor, an ammonium salt such as $H_3PO_4$, $NH_4H_2PO_4$, $(NH_4)_2HPO_4$ or $P_2O_5$ may be used.

In addition, the alkalinizing agent may be an alkali metal hydroxide, alkaline earth metal hydroxide or an ammonia compound.

In step (b), the supercritical or subcritical water may have a temperature of 200 to 700° C. under pressure of 180 to 550 bar. In step (c), the calcination temperature may be 600 to 1,200° C.

If desired, after step (1) and before step (2), washing may be performed to remove impurity salts (e.g., $NH_4NO_3$) which may remain the primary particles or ionic impurities (e.g., $NO^{3-}$ or $SO_4^{2-}$ decomposed from metal precursors).

Preferably, in step (2), the primary particles and the binder are present in the mixture in an amount of 5 to 20 wt % and 5 to 20 wt %, respectively, with respect to the weight of the solvent. The porosity of the secondary particles can be controlled by varying the ratio of the primary particles and the solvent. Examples of the solvent used in the step may include all organic solvents including polar solvents such as water and non-polar solvents. Examples of the binder used in the step include, but are not limited to, sucrose and lactose-based sugars, PVDF- or PE-based polymers and cokes which are soluble in a polar solvent.

In step (3), the dying and preparation of the secondary particles may be carried out at the same time by various methods known in the art, including spray drying, fluidized-bed drying, vibration drying, etc. In particular, rotating spray drying is preferred, because it enables preparation of secondary particles in the form of spheres and thus improves tap density.

The drying may be carried out at 120 to 200° C. under inert gas (e.g., Ar, $N_2$) atmosphere.

EXAMPLES

Now, the present invention will be described in more detail with reference to the following examples. These examples are provided only for illustrating the present invention and should not be construed as limiting the scope and spirit of the present invention.

In the present examples, the content of water-soluble base present in a powder was measured according to the following method:

Examples 1-5

A mixture consisting of 0.5 moles of iron sulfate ($FeSO_4 \cdot 7H_2O$), 0.55 moles of phosphate, 1 mole of an aqueous lithium solution ($LiOH \cdot H_2O$) and $NH_3$ present in an amount to adjust pH of the mixture to 6 was placed in an autoclave and purged with nitrogen. The mixture was elevated to a temperature of 200° C. at a rate of 1° C./min, stirred at 100 rpm for 12 hours and cooled at a rate of 1° C./min to ambient temperature.

Figure 1:
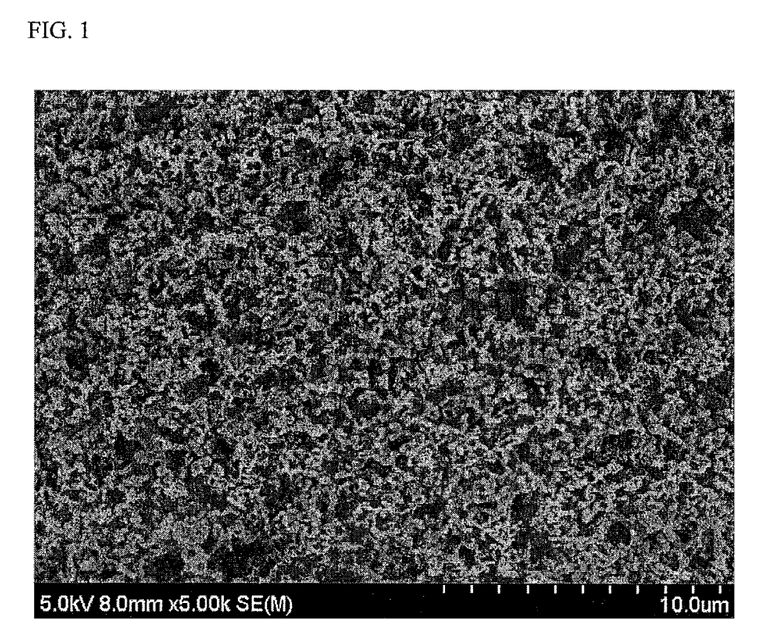
FIG. 1 is a SEM image showing lithium iron phosphate primary particles prepared in Example 1 of the present invention.
Figure 2:
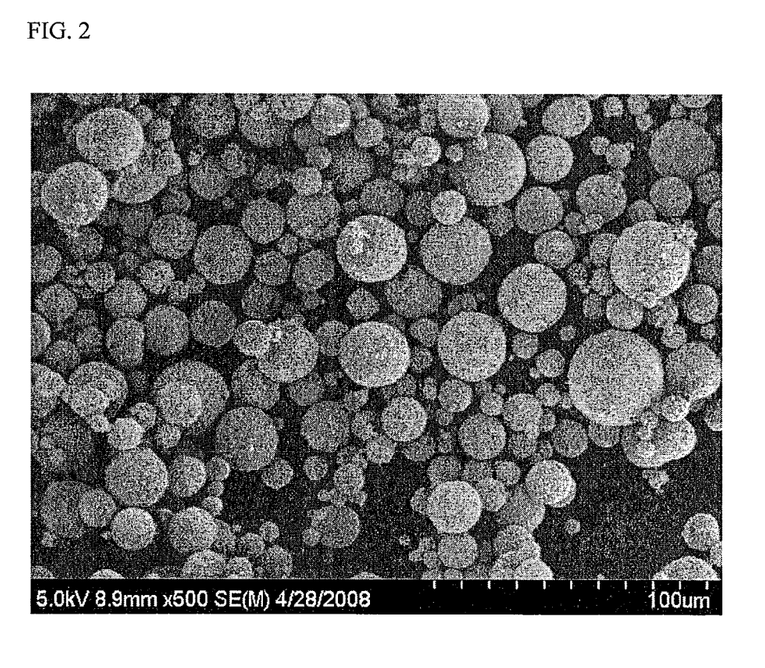
FIG. 2 is a SEM image showing lithium iron phosphate secondary particles prepared in Example 1 of the present invention.

As a result, lithium metal composite oxide ($LiFePO_4$) primary particles were prepared (See FIG. 1). The primary particles and sucrose were added to water with stirring to prepare a mixture. The mixture was aggregated and dried by a rotation spray drying method to prepare secondary particles (See FIG. 2). The secondary particles were dried at 120° C. by a spray drier and calcinated at 700° C. under nitrogen atmosphere for 10 hours.

Figure 3:
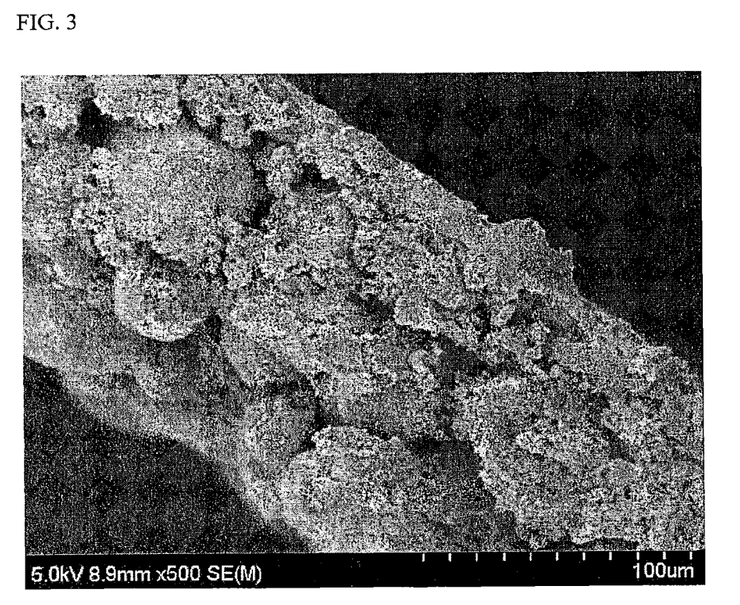
FIG. 3 is a SEM image showing a state wherein the lithium iron phosphate secondary particles prepared in Example 1 of the present invention are applied to an electrode.
Figure 4:
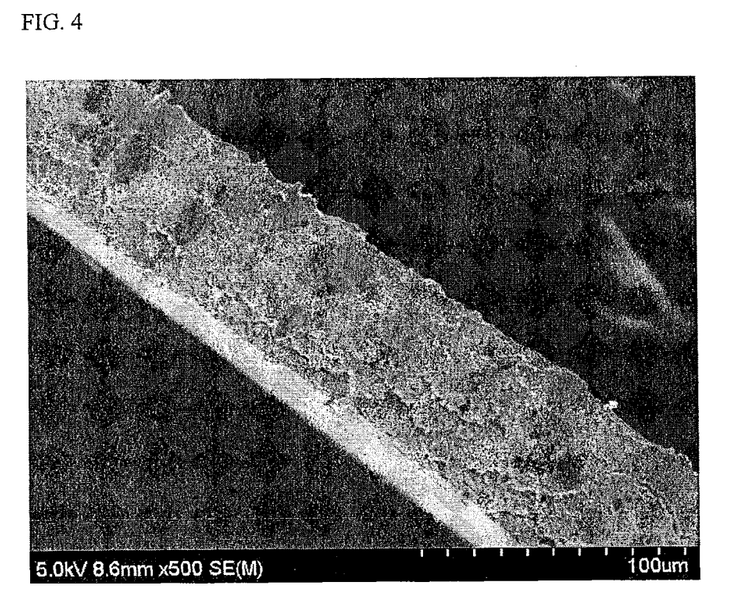
FIG. 4 is a SEM image showing a state wherein the lithium iron phosphate secondary particles are converted into primary particles by press-rolling in Example 1 of the present invention.

90% by weight of the secondary particles thus prepared, 5% by weight of SUPER P® (Conductive Carbon Black, TIMCAL) as a conductive material and 5% by weight of PVdF as a binder were added to NMP as a solvent, to prepare a cathode mix slurry. The cathode mix slurry was coated on one surface of an aluminum foil, followed by drying (See FIG. 3). The cathode mix slurry was pressed to fabricate a cathode. As can be seen from FIG. 4, a plurality of secondary particles were ground and converted into primary particles.

In Example 1, experiments were repeated to obtain results of Examples 2 to 5 as set forth in the following Table 1 by controlling the content of the solid in the range of 10 to 20% by weight upon spray drying. That is, when the content of the solid is increased within the range defined above, porosity is decreased and when the content of the solid is decreased within the range defined above, porosity is increased.

Experimental Example 1

Figure 5:
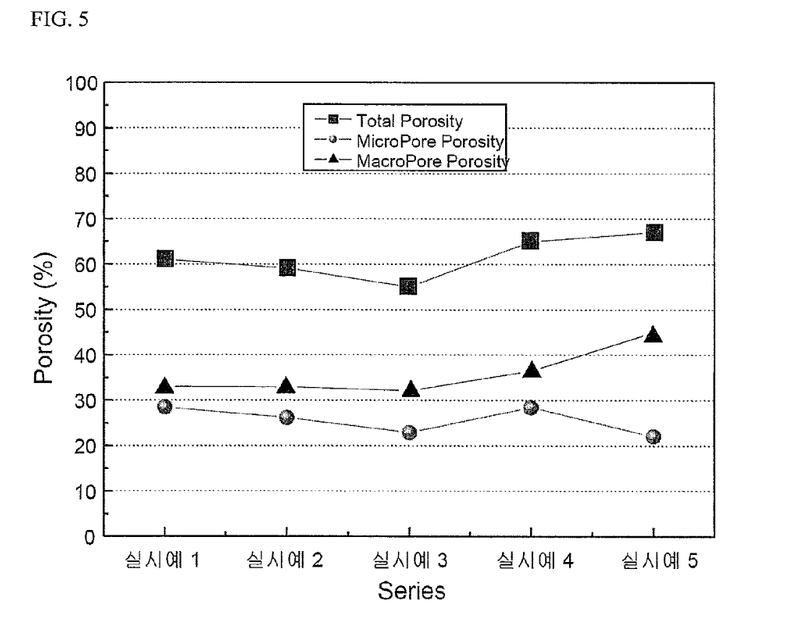
FIG. 5 is a graph showing porosity of an electrode measured in Experimental Example 1 of the present invention.
Figure 6:
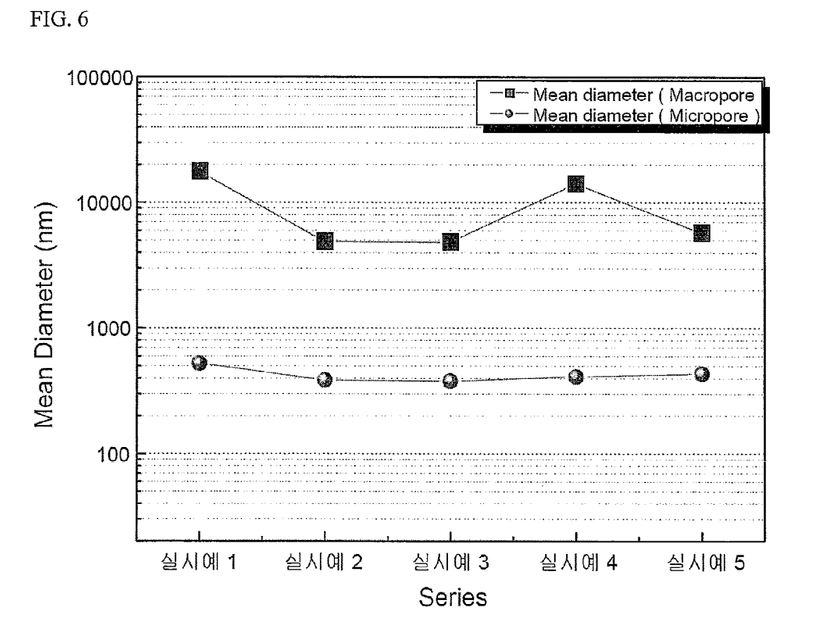
FIG. 6 is a graph showing a mean pore size of an electrode measured in Experimental Example 1 of the present invention.

Physical properties including porosity, mean particle diameter, BET and density of the cathodes of Examples 1 to 5 were measured. The results thus obtained are shown in Tables 1 to 4 below and FIGS. 5 and 6.

TABLE 1

|  | Total porosity (%) | Porosity of secondary particles (%) | Porosity between secondary particles (%) |
|---|---|---|---|
| Ex. 1 | 61.0 | 28.5 | 33.0 |
| Ex. 2 | 59.1 | 26.2 | 32.9 |

TABLE 1-continued

|  | Total porosity (%) | Porosity of secondary particles (%) | Porosity between secondary particles (%) |
|---|---|---|---|
| Ex. 3 | 55.0 | 22.9 | 32.1 |
| Ex. 4 | 64.9 | 28.5 | 36.5 |
| Ex. 5 | 67.0 | 22.1 | 44.9 |

TABLE 2

|  | Mean particle diameter (Volume) (nm) | Mean particle diameter of secondary particles (Volume) (nm) | Mean particle diameter between secondary particles (Volume) (nm) |
|---|---|---|---|
| Ex. 1 | 8947.6 | 522.5 | 17533.2 |
| Ex. 2 | 2686.6 | 384.2 | 4855.4 |
| Ex. 3 | 3030.1 | 379.3 | 4826.6 |
| Ex. 4 | 4228.8 | 409.3 | 14082.7 |
| Ex. 5 | 2186.1 | 432.8 | 5681.0 |

TABLE 3

|  | Total BET ($m^2/g$) | BET of secondary particles ($m^2/g$) | BET between secondary particles ($m^2/g$) |
|---|---|---|---|
| Ex. 1 | 6.997 | 6.778 | 0.221 |
| Ex. 2 | 7.703 | 7.023 | 0.679 |
| Ex. 3 | 7.475 | 6.737 | 0.736 |
| Ex. 4 | 8.684 | 8.214 | 0.468 |
| Ex. 5 | 8.930 | 8.930 | 0.349 |

TABLE 4

|  | Apparent (skeletal) Density (g/mL) | Apparent (skeletal) Density (g/mL) - Micro | Apparent (skeletal) Density (g/mL) - Macro |
|---|---|---|---|
| Ex. 1 | 0.93 | 0.51 | 0.53 |
| Ex. 2 | 1.06 | 0.59 | 0.65 |
| Ex. 3 | 0.86 | 0.50 | 0.57 |
| Ex. 4 | 1.05 | 0.51 | 0.58 |
| Ex. 5 | 1.20 | 0.55 | 0.60 |

As can be seen from the data shown in Table 1 to 4, lithium iron phosphates according to Examples of the present invention have a high porosity and density.

Comparative Example 1

Figure 7:
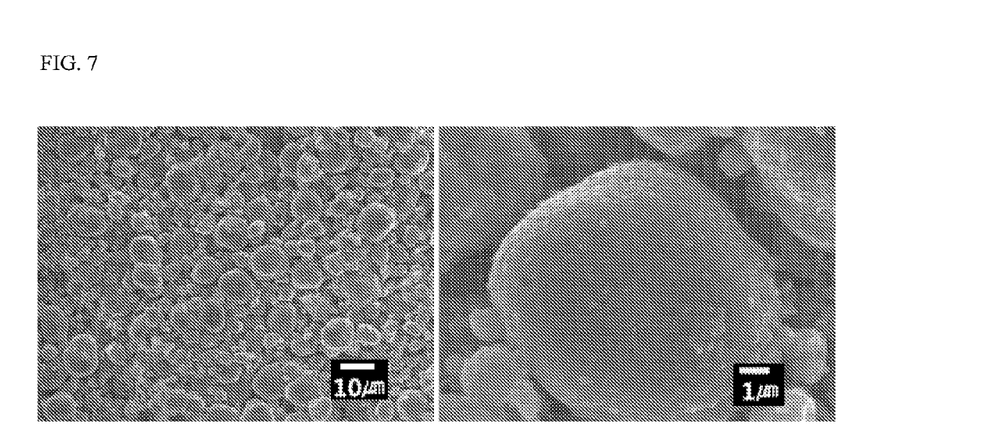
FIG. 7 is a SEM image of lithium iron phosphate secondary particles prepared in Comparative Example 1.

Lithium metal composite oxide ($LiFePO_4$) secondary particles were prepared by coprecipitation. The SEM images of the secondary particles thus prepared are illustrated in FIG. 7. As can be seen from FIG. 7, the secondary particles have no pore.

Experimental Example 2

95% by weight of carbon as an anode active material, 1.5% by weight of SUPER P® as a conductive material and 3.5% by weight of PVdF as a binder were added to NMP as a solvent, to prepare an anode mix slurry. The anode mix slurry was coated on one surface of an aluminum foil, followed by drying and pressing, to fabricate an anode.

The cathode and the anode fabricated in Example 1 and Comparative Example 1, respectively, were laminated using CELGARD® (Separator Film, CELGARD, LLC) as a separator to fabricate an electrode assembly and a lithium non-aqueous electrolyte containing 1M LiPF$_6$ in cyclic and linear carbonate mix solvent was added to the electrode assembly to fabricate a battery.

Figure 8:
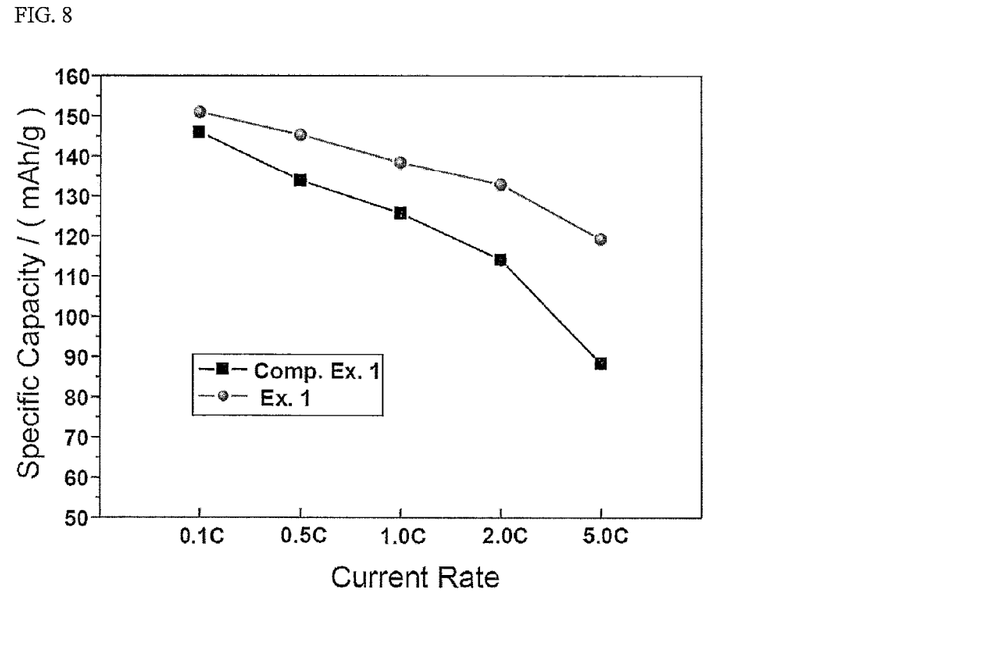
FIG. 8 is a graph showing variations in specific capacity as function of current rate for a secondary battery prepared in Example 1 and a secondary battery prepared in Experimental Example 1 and of the present invention.

The batteries thus fabricated were measured for discharge rate properties and the results thus obtained are shown in FIG. 8.

As can be seen from FIG. 8, the battery of the present invention (Example 1) exhibited high overall discharge capacity (in particular, higher capacity in the case of high-rate discharge), as compared to the battery of Comparative Example 1.

INDUSTRIAL APPLICABILITY

As apparent from the above description, the lithium iron phosphate according to the present invention is composed of secondary particles having a high porosity, thus being easy to handle and exhibiting process efficiency, when used as an electrode active material to fabricate an electrode. Furthermore, primary particles are present in fabricated batteries, thus exhibiting high electrical conductivity and bulk density and imparting improved capacity and rate properties to the batteries.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrode comprising a cathode mix having an olivine-type lithium iron phosphate being applied to a current collector,
   wherein the olivine-type lithium iron phosphate is composed of secondary particles having a mean particle diameter (D50) of 5 to 100 μm, and the secondary particles are formed by aggregation of primary particles having a mean particle diameter (D50) of 50 to 550 nm,
   wherein the primary particles are aggregated via physical bonds to form the secondary particles,
   wherein the olivine-type lithium iron phosphate is LiFePO$_4$,
   wherein the secondary particles have a porosity of 18 to 22.9%, and a portion of the secondary particles are deformed and converted into primary particles,
   wherein the primary particles are prepared by a supercritical hydrothermal method, and
   wherein the olivine-type lithium iron phosphate has a bulk density of 0.5 to 1.5 g/mL.

2. The electrode according to claim 1, wherein the primary particles each independently have an olivine-type crystal structure.

3. The electrode according to claim 1, wherein the secondary particles have a pore size of 10 to 1,000 nm.

4. The electrode according to claim 1, wherein the primary particles have a mean particle diameter (D50) of 100 to 300 nm and the secondary particles have a mean particle diameter (D50) of 5 to 40 μm.

5. The electrode according to claim 1, wherein the secondary particles have a spherical shape.

6. The electrode according to claim 1, wherein the secondary particles have a specific surface area (BET) of 5 to 15 m$^2$/g.

7. The electrode according to claim 1, wherein the olivine-type lithium iron phosphate has a bulk density of 0.8 to 1.3 g/mL.

8. The electrode according to claim 1, wherein the secondary particles have a pore size of 200 to 700 nm.

9. A lithium secondary battery comprising the electrode according to claim 1.

* * * * *